(12) United States Patent
Kuwadekar et al.

(10) Patent No.: US 11,207,601 B2
(45) Date of Patent: Dec. 28, 2021

(54) METHODS FOR PROVIDING A VIRTUAL AND AN INTERACTIVE GAMING ENVIRONMENT AND DEVICES THEREOF

(71) Applicant: Cray Productions, LLC, Seoul (KR)

(72) Inventors: Sanjeev Kuwadekar, Porter Ranch, CA (US); Victor Sim, Seoul (KR); Spencer So, Fort Wayne, IN (US)

(73) Assignee: CRAY PRODUCTIONS, LLC, Gangnam-Gu (KR)

( * ) Notice: Subject to any disclaimer, the term of this patent is extended or adjusted under 35 U.S.C. 154(b) by 43 days.

(21) Appl. No.: 16/689,532

(22) Filed: Nov. 20, 2019

(65) Prior Publication Data

US 2020/0206634 A1 Jul. 2, 2020

Related U.S. Application Data

(60) Provisional application No. 62/786,484, filed on Dec. 30, 2018.

(51) Int. Cl.
*A63F 13/537* (2014.01)
*A63F 13/69* (2014.01)
(Continued)

(52) U.S. Cl.
CPC ............ *A63F 13/69* (2014.09); *A63F 13/537* (2014.09); *G06N 3/006* (2013.01); *G06T 11/00* (2013.01); *G06T 13/80* (2013.01)

(58) Field of Classification Search
CPC ...... A63F 13/12; A63F 13/355; A63F 13/358; A63F 13/52; A63F 2300/534; A63F 2300/538; A63F 13/537; A63F 13/67; A63F 13/77; G06N 3/006; G06T 11/00; G06T 13/80; G06F 3/011
See application file for complete search history.

(56) References Cited

U.S. PATENT DOCUMENTS 8,108,468 B2* 1/2012 Merrifield .............. G06Q 50/01
709/205
10,193,999 B1* 1/2019 Howell ................... A63F 13/30
(Continued)

OTHER PUBLICATIONS

International Search Report and Written Opinion for PCT/IB2019/001241, dated Apr. 17, 2020.

*Primary Examiner* — David L Lewis
*Assistant Examiner* — Ross A Williams
(74) *Attorney, Agent, or Firm* — Troutman Pepper Hamilton Sanders LLP (Rochester)

(57) ABSTRACT

Methods, non-transitory computer readable media, and virtual game management apparatuses that assist with providing a virtual and an interactive gaming environment includes generating an interactive virtual environment comprising gaming graphics data and animation data to support a plurality of virtual games and providing generated interactive virtual environment to a creation source computing device. Next, customization data to modify the gaming graphics data and the animation data of the provided interactive virtual environment is received from the creation source computing device. The gaming graphics data and the animation data of the provided interactive virtual environment is customized based on the received customization data and the customized interactive virtual environment is provided to a gaming computing device.

15 Claims, 20 Drawing Sheets

(51) Int. Cl.
    *G06N 3/00*     (2006.01)
    *G06T 11/00*     (2006.01)
    *G06T 13/80*     (2011.01)

(56) References Cited

U.S. PATENT DOCUMENTS

| | | |
|---|---|---|
| 2013/0179916 A1 | 7/2013 | Roberts et al. |
| 2013/0296043 A1 | 11/2013 | Weinshanker et al. |
| 2014/0228119 A1 | 8/2014 | Koenig |
| 2016/0240040 A1 | 8/2016 | Gnanasundram et al. |
| 2018/0214773 A1 | 8/2018 | Ceraldi et al. |

\* cited by examiner

Selection or customization of avatar

Gameplay between gaming devices

METHODS FOR PROVIDING A VIRTUAL AND AN INTERACTIVE GAMING ENVIRONMENT AND DEVICES THEREOF

This application claims the benefit of U.S. Provisional Application No. 62/786,484, filed Dec. 30, 2018, which is hereby incorporated by reference in its entirety.

FIELD

This technology generally relates to methods and devices for providing interactive media and, more particularly, to methods for providing a virtual and an interactive gaming environment and devices thereof.

BACKGROUND

Existing technologies provide online gaming services in a virtual world environment. In order to encourage online gaming developers to develop games in a virtual environment, existing technologies have been developed to provide a set of tools and customizable assets to allow online game developers to rapidly build single player or multi-player virtual games on the virtual environment.

Unfortunately, one of the technological problems faced by the online gaming developers with these existing technologies is the virtual environments in which they are developing these online games are not customizable. In other words, online game developers are restricted to building the games within the virtual environment that is provided without allowing the online game developers to customize the virtual environment to for example the particular online game and/or the capabilities of the gaming computing devices they are designed for. The lack of options to customize the virtual environment in these existing technologies results in technological limitations with for example enhancing the graphics, animation, or other capabilities provided in the virtual environment or adding other new graphics, animation or other capabilities to the existing virtual environment. Similarly, these technological deficiencies negatively impact the resulting online gaming experience by gaming computing devices.

SUMMARY

A method for providing a virtual and an interactive gaming environment includes generating an interactive virtual environment comprising gaming graphics data and animation data to support a plurality of virtual games and providing generated interactive virtual environment to a creation source computing device. Next, customization data to modify the gaming graphics data and the animation data of the provided interactive virtual environment is received from the creation source computing device. The gaming graphics data and the animation data of the provided interactive virtual environment is customized based on the received customization data and the customized interactive virtual environment is provided to a gaming computing device.

A non-transitory computer readable medium having stored thereon instructions for providing a virtual and an interactive gaming environment comprising machine executable code which when executed by at least one processor, causes the processor to generate an interactive virtual environment comprising gaming graphics data and animation data to support a plurality of virtual games and providing generated interactive virtual environment to a creation source computing device. Next, customization data to modify the gaming graphics data and the animation data of the provided interactive virtual environment is received from the creation source computing device. The gaming graphics data and the animation data of the provided interactive virtual environment is customized based on the received customization data and the customized interactive virtual environment is provided to a gaming computing device.

A virtual game management apparatus including at least one of configurable hardware logic configured to be capable of implementing or a processor coupled to a memory and configured to execute programmed instructions stored in the memory to generate an interactive virtual environment comprising gaming graphics data and animation data to support a plurality of virtual games and providing generated interactive virtual environment to a creation source computing device. Next, customization data to modify the gaming graphics data and the animation data of the provided interactive virtual environment is received from the creation source computing device. The gaming graphics data and the animation data of the provided interactive virtual environment is customized based on the received customization data and the customized interactive virtual environment is provided to a gaming computing device.

Accordingly, this technology provides methods, non-transitory computer readable medium, and apparatuses that assist with providing a virtual and an interactive gaming environment. In particular, the virtual environment that is generated using the below illustrated techniques solves the technological problem in the existing technologies by providing a highly customizable virtual environment. In the disclosed technology, the customization requirements to the virtual environment is taken from the online gaming developers and a customized virtual environment is developed specifically for each online gaming developers, which is not routine, convention or well-understood. Similarly, the disclosed technology also considers the computing power of the online gaming consumers and accordingly adjusts the interaction with the virtual environment which again is not routine, convention or well understood when compared with the existing technologies.

DETAILED DESCRIPTION

Figure 1:
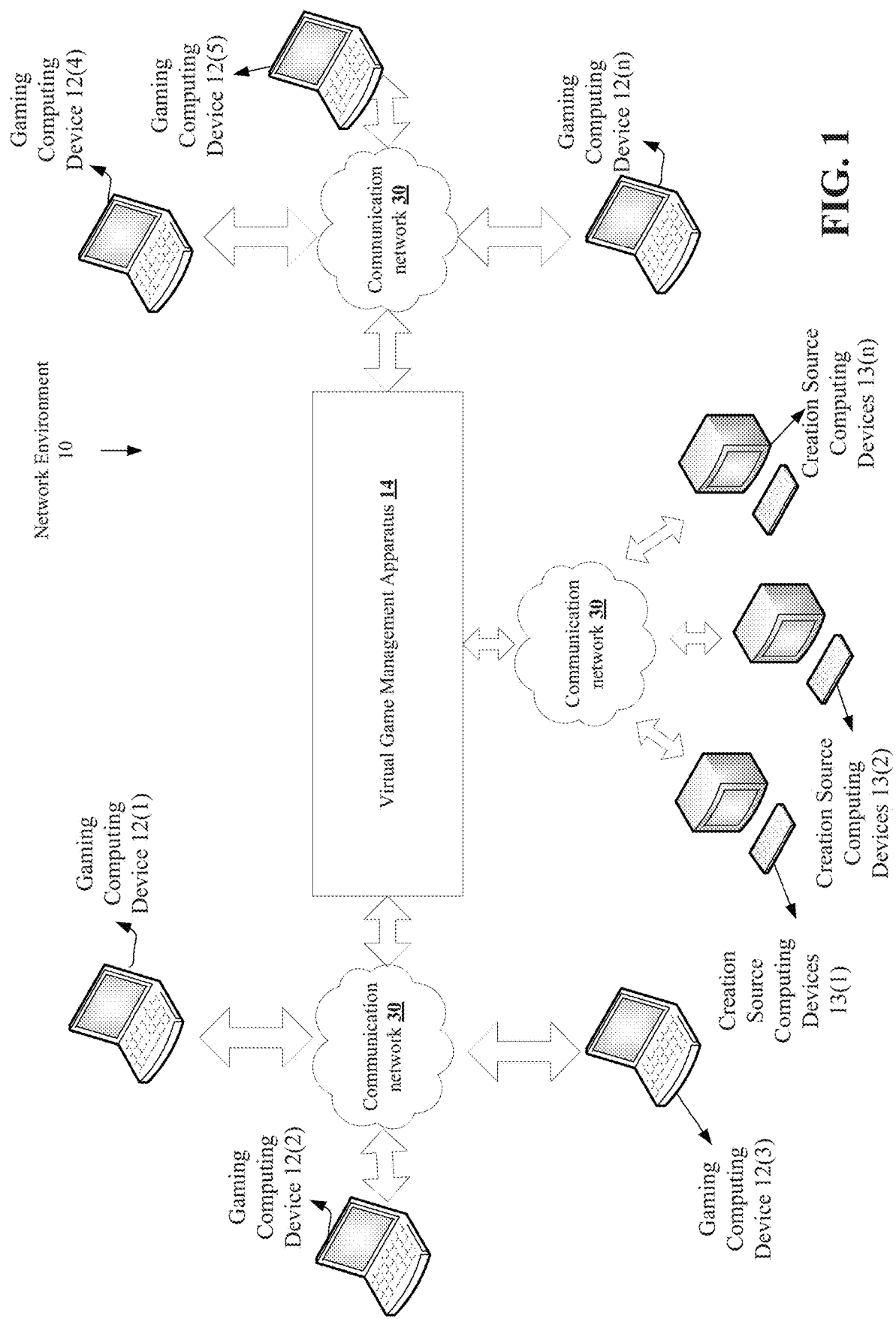
FIG. 1 is a block diagram of a network environment including an example of virtual game management apparatus for providing a virtual and an interactive gaming environment.
Figure 2:
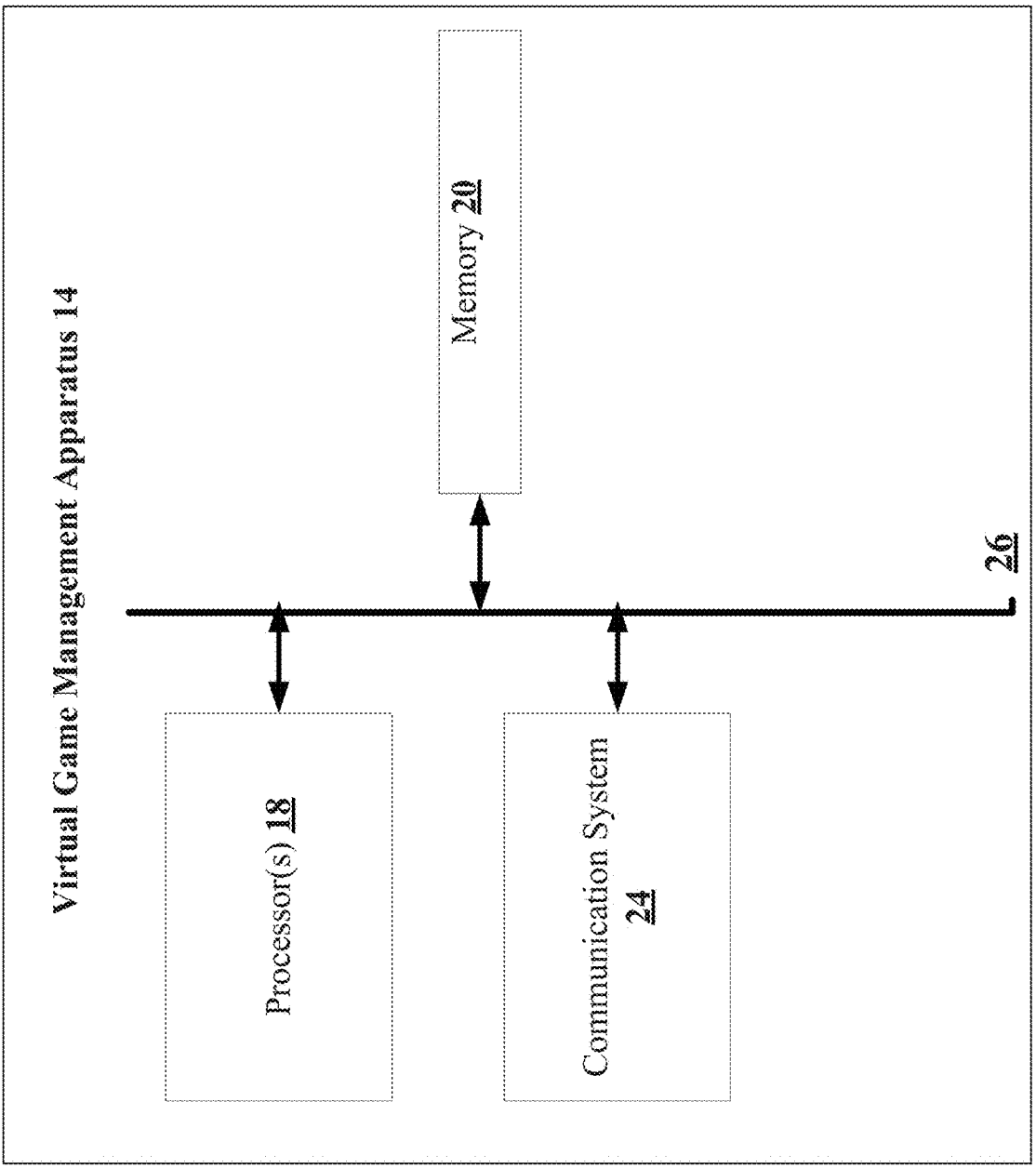
FIG. 2 is an exemplary block diagram of the virtual game management apparatus.

A network environment 10 with an example of a virtual game management apparatus 14 is illustrated in FIGS. 1-2. In this particular example, the environment 10 includes a plurality of gaming computing devices 12(1)-12(n), a plurality of creation source computing devices 13(1)-13(n), and the virtual game management apparatus 14 connected from a communication network 30, although the environment could include other types and numbers of systems, devices such as server devices, components, and/or other elements as is generally known in the art and will not be illustrated or described herein. This technology provides a number of advantages including providing methods, non-transitory computer readable medium, and apparatuses that provides a virtual and an interactive gaming environment.

Referring more specifically to FIGS. 1-2, the virtual game management apparatus 14 is programmed to assist with providing a virtual and an interactive gaming environment, although the apparatus can perform other types and/or numbers of functions or other operations and this technology can be utilized with other types of claims. In this particular example, the virtual game management apparatus 14 includes a processor 18, a memory 20, and a communication system 24 which are coupled together by a bus 26, although the virtual game management apparatus 14 may comprise other types and/or numbers of physical and/or virtual systems, devices, components, and/or other elements in other configurations.

The processor 18 in the virtual game management apparatus 14 may execute one or more programmed instructions stored in the memory 20 for sharing input/output devices for providing a virtual and an interactive gaming environment as illustrated and described in the examples herein, although other types and numbers of functions and/or other operations can be performed. The processor 18 in the virtual game management apparatus 14 may include one or more central processing units and/or general purpose processors with one or more processing cores, for example.

Figure 3:
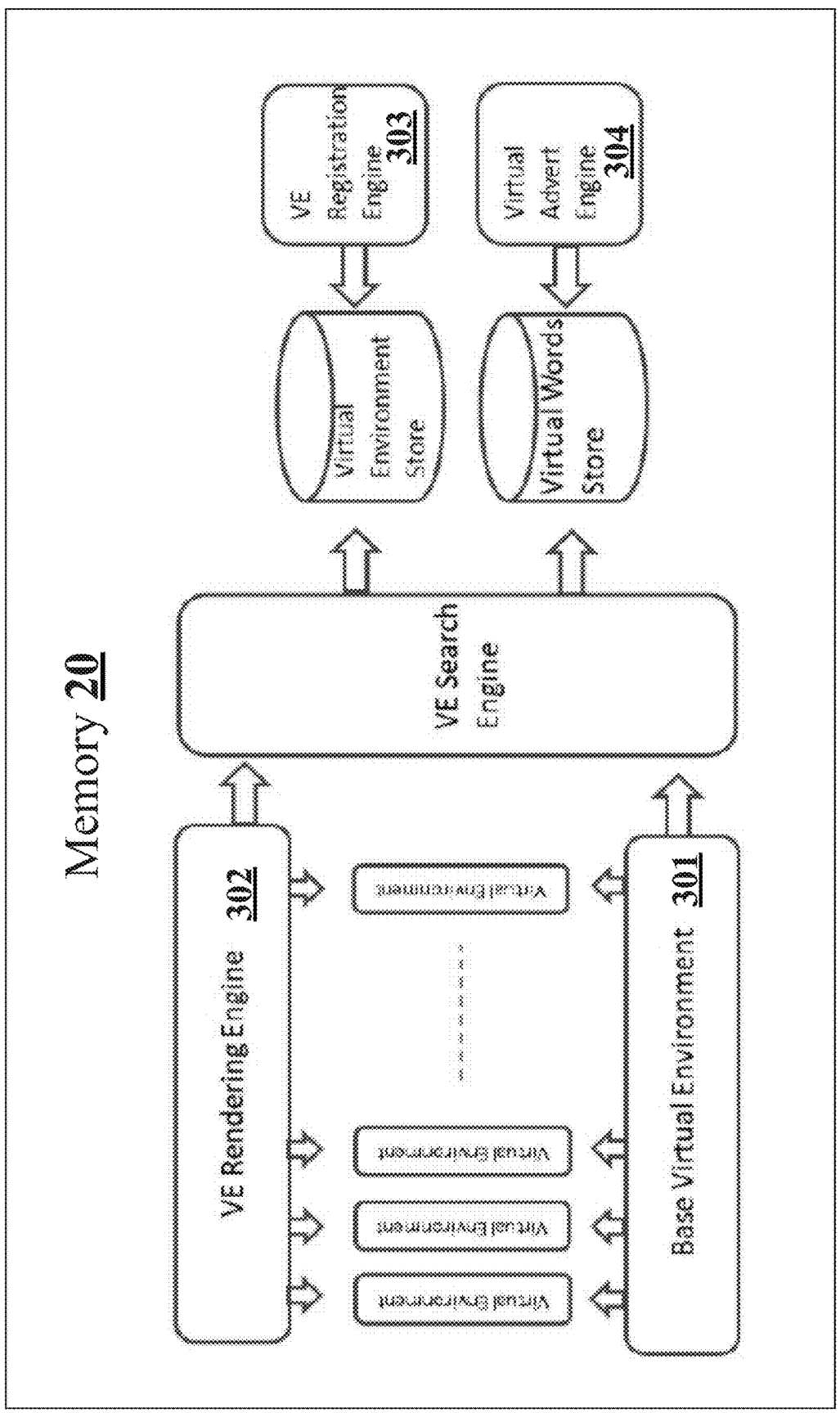
FIG. 3 is an exemplary block diagram of a memory within the virtual game management apparatus.
Figure 4:
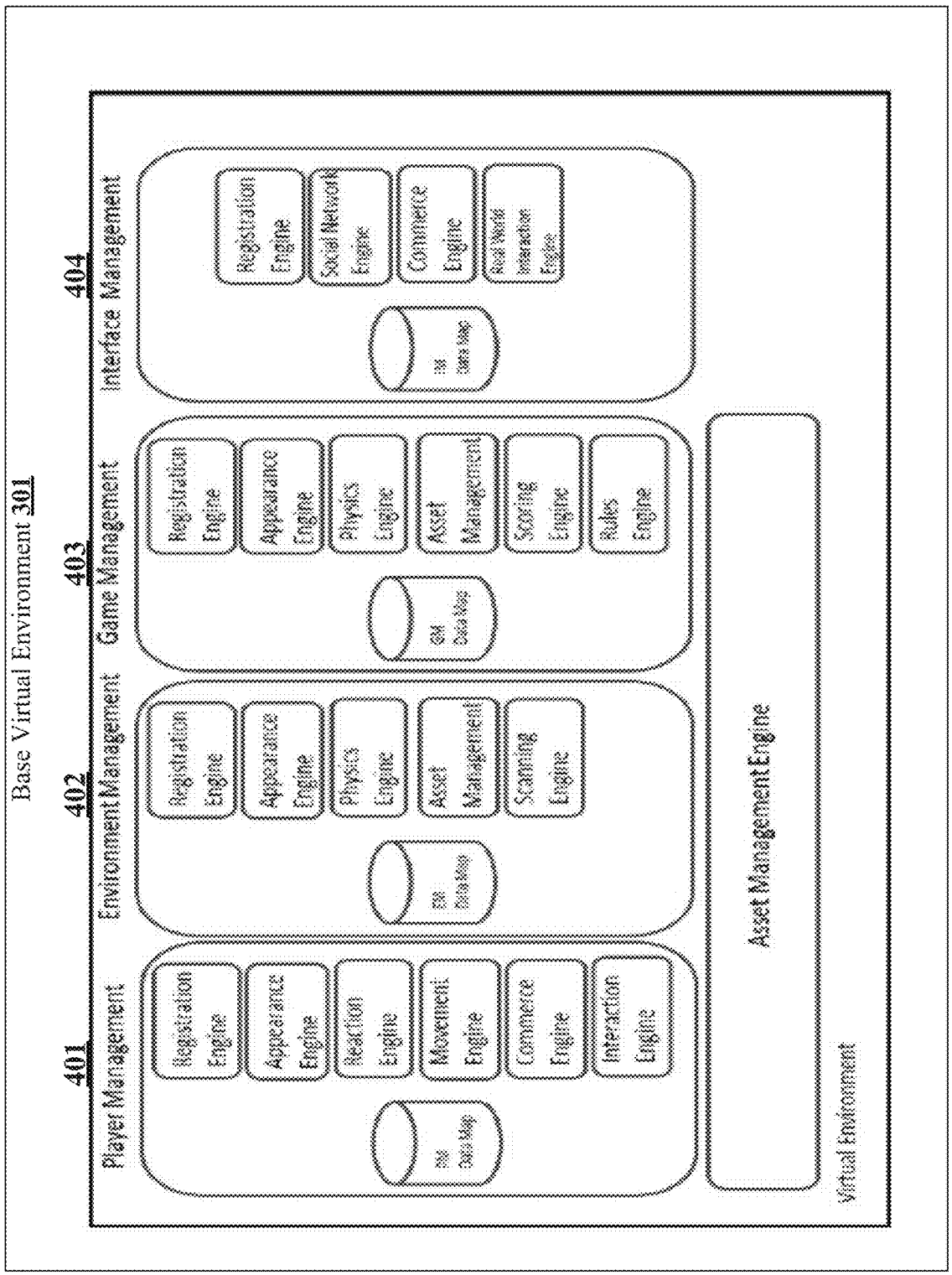
FIG. 4 is an exemplary block diagram of a base virtual environment within the memory of the virtual game management apparatus.
Figure 5:
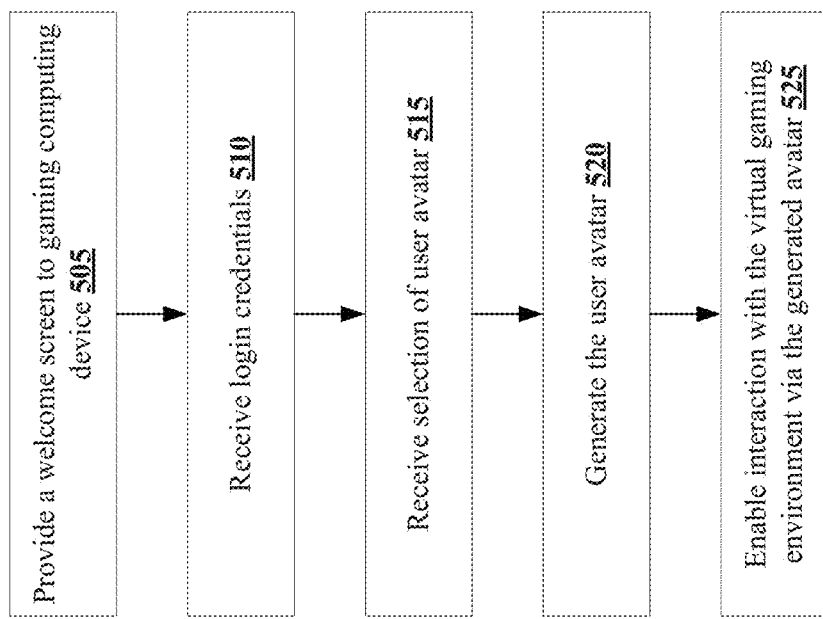
FIG. 5 is an exemplary flowchart of a method for providing a virtual and an interactive gaming environment.

The memory 20 in the virtual game management apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20. Further, as illustrated in FIG. 3, memory 20 includes a base virtual environment 301, virtual environment (VE) rendering engine 302, VE registration engine 303, and a VE advert engine 304, although the memory 20 can include other types or amounts of information. In this example, the base virtual environment 301 assists with common functions and interactions required to implement a virtual environment such as player identification, players entry, exit, and movements, player interaction with other players, player reactions and emotions, player assets, commerce, laws of physics, composition and rendering of virtual environment, and mapping between real environment and virtual environments, although the base virtual environment 301 can perform other functions. Further as illustrated in FIG. 4, the base virtual environment 301 includes player management 401, environment management 402, game management 403, and an interface management 404, to assist the base virtual environment 301 with common functions and interactions required to implement a virtual environment. In this example, the player management 401 includes data driven engines to manage player registrations, entry and exit (Registration Engine), avatar appearance (Appearance Engine), emotional reactions and facial expressions (Reaction Engine), movement within a virtual environment (Movement Engine), transactions within virtual environment (Commerce Engine) and interactions between other players and virtual entities (interaction engine), although the player management 401 can include other types or amounts of information. Next, the environment management 402 includes data driven engines to manage environment registrations (Registration Engine), appearance (Appearance Engine), laws of physics within each environment (Physics Engine), representations of various virtual assets (Asset Management Engine) and visual representation of the virtual environment (scanning engine). Additionally, the environment management 402 also includes algorithm to create multiple visual representations of the entire virtual environment or part of the virtual environment to allow for scalability. Further, the game management 403 includes data driven engines to manage game registrations (Registration Engine), appearance (Appearance Engine), Laws of Physics within each game (Physics Engine), representations of various virtual assets within a game (Asset Management Engine), game rules (Rules Engine) and scoring methods for a game (Scoring Engine). Furthermore, the interface management 404 within the base environment 301 includes data driven engines to manage interfaces between virtual environment and real environment and also includes interface registrations (Registration Engine), interfaces to social networks (Social Networking Engine), mapping virtual transactions to real transactions (Commerce Engine) and mapping between real world interactions and virtual environment interactions (Interaction Engine).

Now with reference to FIG. 3, the virtual environment (VE) rendering engine 302 assists with providing functions to allow sensory (smell, sound, taste, touch, and sight) interactions of players with customized virtual environments, although the VE rendering engine 302 can perform other types or amounts of functions. Further, the virtual environment (VE) registration engine 303 assists with allowing developers to register customized virtual environments into virtual universe and to add custom tags to the customized virtual environments, although the VE registration engine 303 can assist with other types of functions. Additionally, the virtual advert engine 304 assists with real-time bidding exchange to allow developers to promote their virtual environments and determines the order of the search results when the plurality of gaming computing devices 12(1)-12(n) performs a search for gaming environments.

The communication system 24 in the virtual game management apparatus 14 operatively couples and communicates between plurality of gaming computing devices 12(1)-12(n) and the plurality of creation source computing devices 13(1)-13(n), which are all coupled together by one or more of the communication networks 30, although other types and numbers of communication networks or systems with other types and numbers of connections and configurations to other devices and elements. By way of example only, the communication networks can use TCP/IP over Ethernet and industry-standard protocols, including NFS, CIFS, SOAP, XML, LDAP, SCSI, and SNMP, although other types and numbers of communication networks, can be used. The communication network 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. Alternatively, the communication network can include any telecommunication protocols such as 3G, 4G, LTE, or 5G, by way of example.

In this particular example, each of the gaming computing devices 12(1)-12(n) may communicate with the virtual game management apparatus 14 to interact with the virtual gaming platform, although the plurality of gaming computing devices 12(1)-12(n) can interact with the virtual game management apparatus 14 for other purposes. Each of the gaming computing devices 12(1)-12(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements. In this example, the plurality of gaming computing devices 12(1)-12(n) can be a laptop, personal computer, a smartphone, tablet, although the gaming computing devices can include other types of devices.

Further in this example, the plurality of creation source computing devices 13(1)-13(n) communicates with the virtual game management apparatus 14 via the communication network 30 to provide content for creating a virtual environment, although the plurality of creation source computing devices 13(1)-13(n) can communicate with the virtual game management apparatus 14 using other techniques. Each of the plurality of creation source computing devices 13(1)-13(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements. In this example, the plurality of gaming computing devices 12(1)-12(n) can be a laptop, personal computer, a smartphone, tablet, although the gaming computing devices can include other types of devices.

Although the exemplary network environment 10 with the virtual game management apparatus 14, the plurality of creation source computing devices 13(1)-13(n) and the plurality of gaming computing devices 12(1)-12(n), is described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s). The disclosed technology can be implemented as module or components of another application. Further, the disclosed technology can be implemented as operating system extensions, module, plugins, or the like. The disclosed technology can be implemented as module or components of another application. Further, the disclosed technology can be implemented as operating system extensions, module, plugins, or the like. Even further, the disclosed technology may be operative in a cloud-based computing environment. The disclosed technology can be executed within virtual machine(s) or virtual server(s) that may be managed in a cloud-based computing environment. Also, the disclosed technology, including the virtual game management apparatus 14 itself, may be located in virtual server(s) running in a cloud-based computing environment rather than being tied to one or more specific physical network computing devices. Also, the disclosed technology may be running in one or more virtual machines (VMs) executing on the virtual game management apparatus 14. Additionally, in at least one of the various embodiments, virtual machine(s) running on the virtual game management apparatus 14 may be managed or supervised by a hypervisor.

Although the virtual game management apparatus 14 is illustrated as single device, one or more actions of the virtual game management apparatus 14 may be distributed across one or more distinct computing devices. Moreover, the virtual game management apparatus 14 is not limited to a particular configuration. Thus, the virtual game management apparatus 14 may contain a plurality of computing devices that operate using a master/slave approach, whereby one of the computing device of the virtual game management apparatus 14 operate to manage and/or otherwise coordinate operations of the other network computing devices. The virtual game management apparatus 14 may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the virtual game management apparatus 14 in FIG. 1 can operate within other computing devices (not shown) rather than as a stand-alone computing device.

While the virtual game management apparatus 14 is illustrated in this example as including a single device, the virtual game management apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise virtual game management apparatus 14 in other examples can be standalone devices or integrated with one or more other devices or applications, for example. Moreover, one or more of the devices of the virtual game management apparatus 14 in these examples can be in a same or a different communication network including one or more public, private, virtual or cloud networks, for example.

One or more of the components depicted in the network environment, such as the virtual game management apparatus 14, for example, may be configured to operate as virtual instances on the same physical machine. In other words, the virtual game management apparatus 14 illustrated in FIG. 1 may operate on the same physical device rather than as separate devices communicating through a network as depicted in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 6:
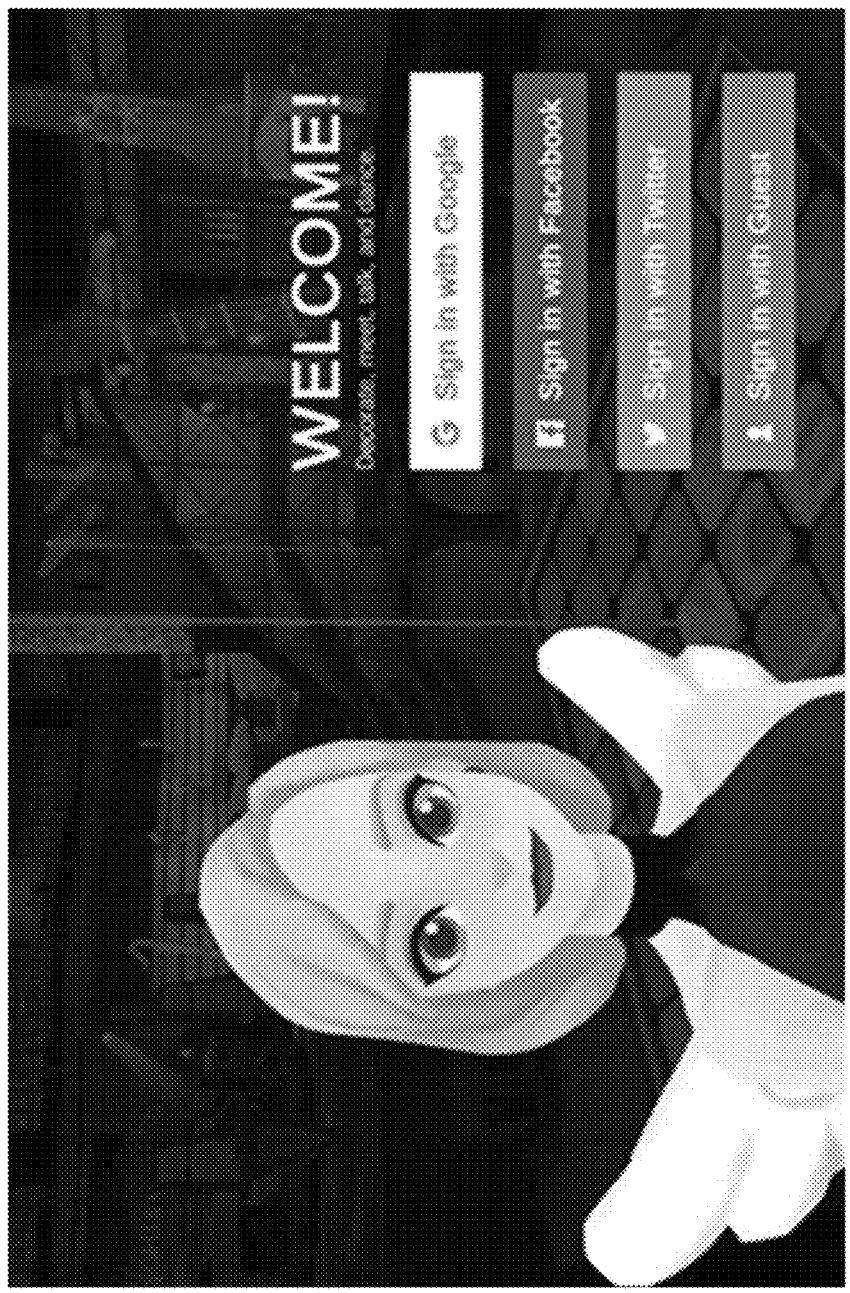
FIG. 6 is an exemplary image illustrating a login screen.
Figure 7:
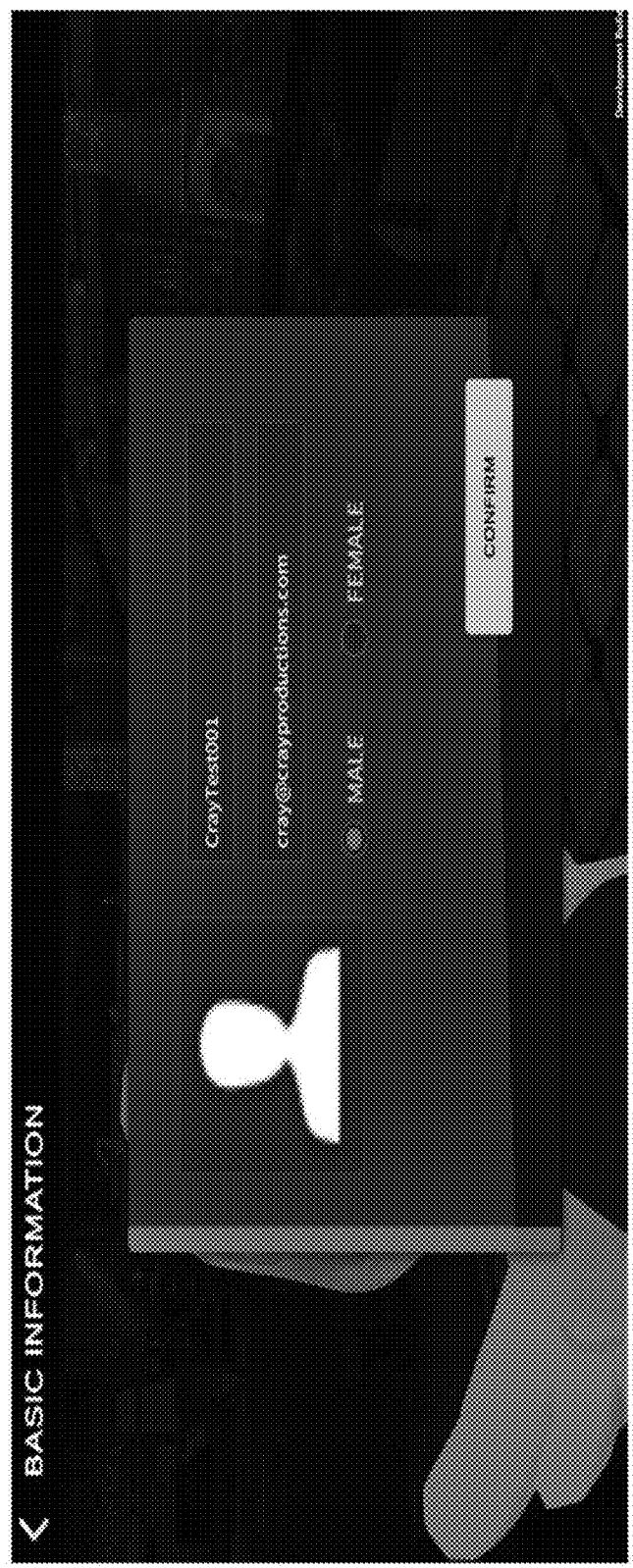
FIG. 7 is an exemplary image illustrating login information that is received.

An example of a method for providing a virtual and an interactive gaming environment will now be described with reference to FIGS. 1-17. The exemplary method begins at step 505, where the virtual game management apparatus 14 provides a welcome screen to a plurality of gaming computing devices 12(1)-12(n) to login or sign-up to the virtual environment, although other types techniques can be used to login or sign-up a new user to the virtual environment. By way of example, FIG. 6 includes an exemplary image with the welcome screen for an already registered user to login or for a new user to sign-up to the virtual environment.

Next in step 510, the virtual game management apparatus 14 receives login credentials including a username and a password from one of the plurality of gaming computing devices 12(1)-12(n), although the virtual game management apparatus 14 can receive other types or amounts of information. In this example, if a new user is signing in to the virtual environment, the virtual game management apparatus 14 receives and stores the username and password into a cache memory within the memory 20, although the user credentials can be stored at other memory locations. Alternatively, if the user is already a registered user, the virtual game management apparatus 14 compares the username and password against the username and password stored within the cache memory and provides access only when the provided username and password exactly matches with the stored username and password, although other techniques can be used for authentication of the user using the requesting one of the plurality of gaming computing devices 12(1)-12(n).

Figure 8A:
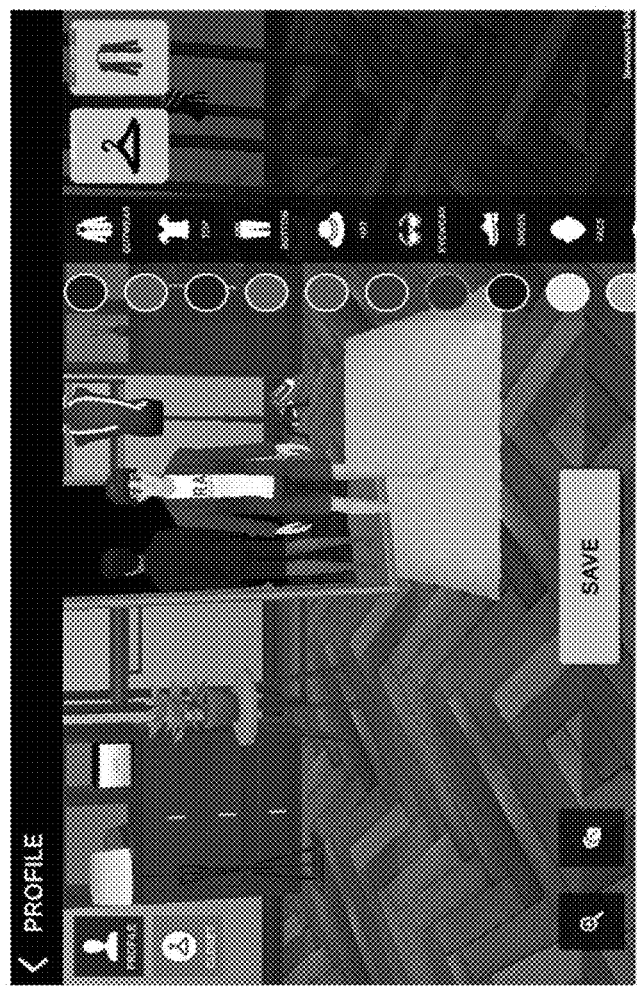
FIGS. 8A-8B are exemplary images of the profile created for a user of a gaming computing devices.
Figure 8B:
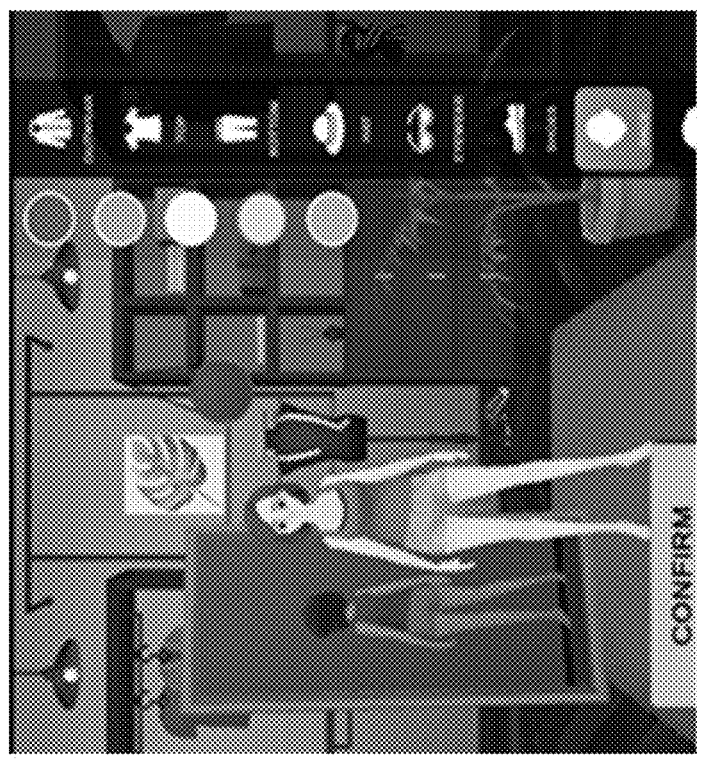

In step 515, the virtual game management apparatus 14 receives a selection of user's avatar including gender, clothes, face type, hair type, profile picture, from the requesting one of the plurality of gaming computing devices 12(1)-12(n), although the virtual game management apparatus 14 can receive other types or amounts of information from the requesting one of the plurality of gaming computing devices 12(1)-12(n). In this example, avatar relates to a graphical representation of the user using the requesting one of the plurality of gaming computing devices 12(1)-12(n) in form of animation. By way of example, FIGS. 8A-8B are exemplary images illustrating the selection of the user's avatar or customizing existing avatar from the requesting one of the plurality of gaming computing devices 12(1)-12(n).

Figure 9:
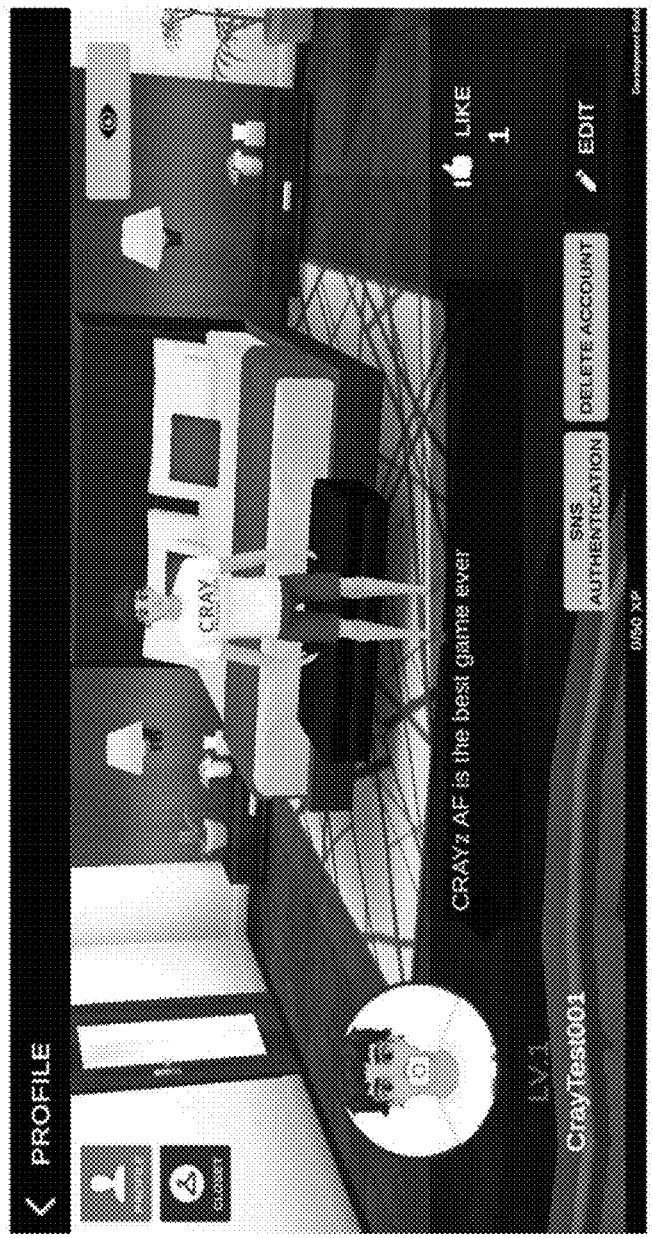
FIG. 9 is an exemplary image of a profile within the virtual environment.

Next in step 520, the virtual game management apparatus 14 generates an avatar of the user using the requesting one of the plurality of gaming computing devices 12(1)-12(n) based on the selection or customization received in step 515, although the virtual game management apparatus 14 can generate the avatar using other types or amounts of information. By way of example, FIG. 9 is an exemplary image of an avatar that is generated by the virtual game management apparatus 14.

In step 525, the virtual game management apparatus 14 enables the requesting one of the plurality of gaming computing devices 12(1)-12(n) to navigate through a virtual gaming environment via the generated avatar and the different navigation features along with options will be further illustrated below. By way of example, the requesting one of the plurality of gaming computing devices 12(1)-12(n) can navigate through the virtual gaming environment created by the virtual game management apparatus 14 to socially interact with other gaming computing devices of the plurality of gaming computing devices 12(1)-12(n) that are using the virtual gaming environment, although other types of interactions can be enabled which will be further illustrated below.

In this example, one of the interactions that is enabled by the virtual game management apparatus 14 is generating a virtual environment and enabling social interaction within the generated virtual gaming environment which will now be further illustrated with reference to the flowchart in FIG. 10. In step 1005, the virtual game management apparatus 14 receives a request to socially interact with the other plurality of gaming computing devices 12(1)-12(n) from one of the plurality of gaming computing devices 12(1)-12(n).

In step 1010, the virtual game management apparatus 14 provides a list of virtual environments (otherwise each is called turf in this example) in which the social interaction between the requesting one of the gaming computing device and the other plurality of gaming computing devices 12(1)-12(n) can be generated. By way of example, the list of virtual environment can include a coffee shop, a dance club, a sporting event, a park, a restaurant, downtown of a city, although the list can include other types of virtual gaming environment. In this example, the virtual environments that are provided in the list are generated using the exemplary flowchart illustrated in FIG. 17 that will be further illustrated below.

In step 1015, the virtual game management apparatus 14 receives a selection of one of the virtual environment from the requesting one of the plurality of gaming computing devices 12(1)-12(n).

In step 1020, the virtual game management apparatus 14 generates the virtual environment based on the received selection, although the virtual environment can be generated using other types or amounts of information. In this example, the generated virtual environment includes a graphical representation (or animation) of the selected virtual location, although the virtual location can be represented in other formats. By way of example, if the virtual environment selected is a park, then the virtual location for a park generated by the virtual game management apparatus 14 can include trees, lawns, flowers, birds, benches, fountain, although the virtual location for a park can include other features describing a park. Alternatively in another example, the virtual game management apparatus 14 can obtain a stored virtual environment based on the received selection from the cache memory within the memory 20 instead of generating the virtual environment. By way of example, the virtual game management apparatus 14 can generate multiple virtual environments and store the generated virtual environments into a cache memory within the memory 20. Optionally, the virtual game management apparatus 14 can also receive a virtual environment that is created by another one of the plurality of gaming computing devices 12(1)-12(n) and can also store the virtual environment within the memory 20. While storing the virtual environment, the virtual game management apparatus 14 can also assign a tag to identify the type of the virtual environment, such as a park, a bar, or a restaurant. Accordingly, when the virtual game management apparatus 14 receives the selection of the virtual environment, the virtual game management apparatus 14 can use the tags to identify the corresponding virtual environment from the cache memory and retrieve the identified virtual environment. In yet another example, the virtual game management apparatus 14 can be triggered to generate a new virtual environment when a number of plurality of gaming computing devices 12(1)-12(n) using a current virtual environment exceeds a stored or set threshold and then can transition one or more of the of plurality of gaming computing devices 12(1)-12(n) into the new virtual environment based on one or more rules, such as hardware and software configurations of the plurality of gaming computing devices 12(1)-12(n).

In step 1025 the virtual game management apparatus 14 stores the generated virtual environment within the cache memory of the memory 20, although the virtual game management apparatus 14 can store the generated virtual environment at other memory locations.

In step 1030, the virtual game management apparatus 14 integrates the avatar created in step 515 with the virtual location generated above in step 1020. By integrating the avatar into the selected virtual location, the virtual game management apparatus 14 is able to create a social interaction at a virtual environment selected by the user of the requesting one of the plurality of gaming computing devices 12(1)-12(n) as opposed to a standard virtual environment.

Figure 11:
FIG. 11 is an exemplary image illustrating social interaction within the virtual environment.

In step 1035, the virtual game management apparatus 14 provides the generated virtual environment and enables the requesting one of the plurality of gaming computing devices 12(1)-12(n) to interact with the other plurality of gaming computing devices 12(1)-12(n) who have also selected the same virtual location. In other words, if the requesting one of the plurality of gaming computing devices 12(1)-12(n) selects a bar as the virtual location, then upon integrating the generated avatar into the bar, the requesting one of the plurality of gaming computing devices 12(1)-12(n) can interact with the other plurality of gaming computing devices 12(1)-12(n) who have select the bar as the virtual location. By way of example, socially interaction between the requesting one of the plurality of gaming computing devices 12(1)-12(n) with the other plurality of gaming computing devices 12(1)-12(n) within a generated virtual environment is illustrated in FIG. 11. Additionally in this example, prior to providing, the virtual game management apparatus 14 can modify the generated virtual environment based on the technical configurations of the requesting one of the plurality of gaming computing devices 12(1)-12(n).

By way of example, the virtual game management apparatus 14 can consider the processor, memory storage, screen size, screen resolution, bandwidth of the requesting one of the plurality of gaming computing devices 12(1)-12(n) while modifying the generated virtual environment.

Figure 12:
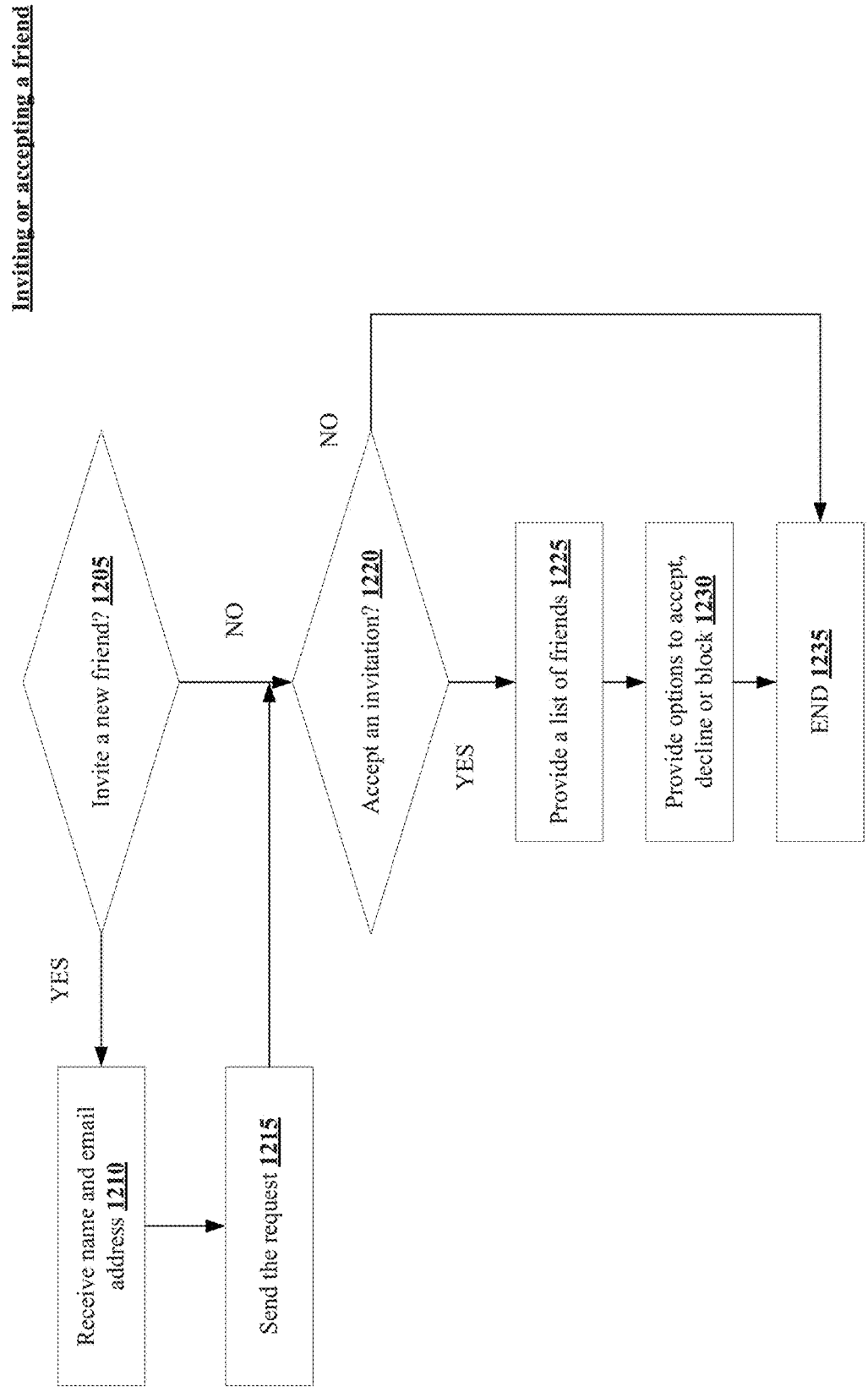
FIG. 12 is an exemplary flowchart illustrating a method for inviting new users.

Further in this example, one of the interactions that is enabled by the virtual game management apparatus 14 is to send the request to a new friend and/or accept an invite from a friend within the virtual gaming environment which will now be further illustrated with reference to the flowchart in FIG. 12. In step 1205, the virtual game management apparatus 14 determines when the requesting one of the plurality of gaming computing devices 12(1)-12(n) is requesting to invite a new friend to join the virtual gaming environment, based on the selection made by the requesting one of the plurality of gaming computing devices 12(1)-12(n). In this example, the virtual game management apparatus 14 within the virtual gaming environment provides an option to invite new friends and the requesting one of the plurality of gaming computing devices 12(1)-12(n) can select the option to invite new friends. Accordingly, when the virtual game management apparatus 14 determines that the requesting one of the plurality of gaming computing devices 12(1)-12(n) is required to invite a new friend, then the Yes branch is taken to step 1210.

In step 1210, the virtual game management apparatus 14 receives the name and email address from the requesting one of the plurality of gaming computing devices 12(1)-12(n), although the virtual game management apparatus 14 can receive other types or amounts of information such as internet protocol address, medium access control identification number to send the invite.

In step 1215, the virtual game management apparatus 14 sends the request to join the virtual gaming environment to the user associated with the received name and the email address.

However, if back in step 1205, when the virtual game management apparatus 14 determines that the requesting one of the plurality of gaming computing devices 12(1)-12(n) is not inviting a new friend to the virtual gaming environment, then the No branch is taken to step 1220. In step 1220, the virtual game management apparatus 14 determines when the requesting one of the plurality of gaming computing devices 12(1)-12(n) wants to accept a pending invitation friend request, then the Yes branch is taken to step 1225.

Figure 13:
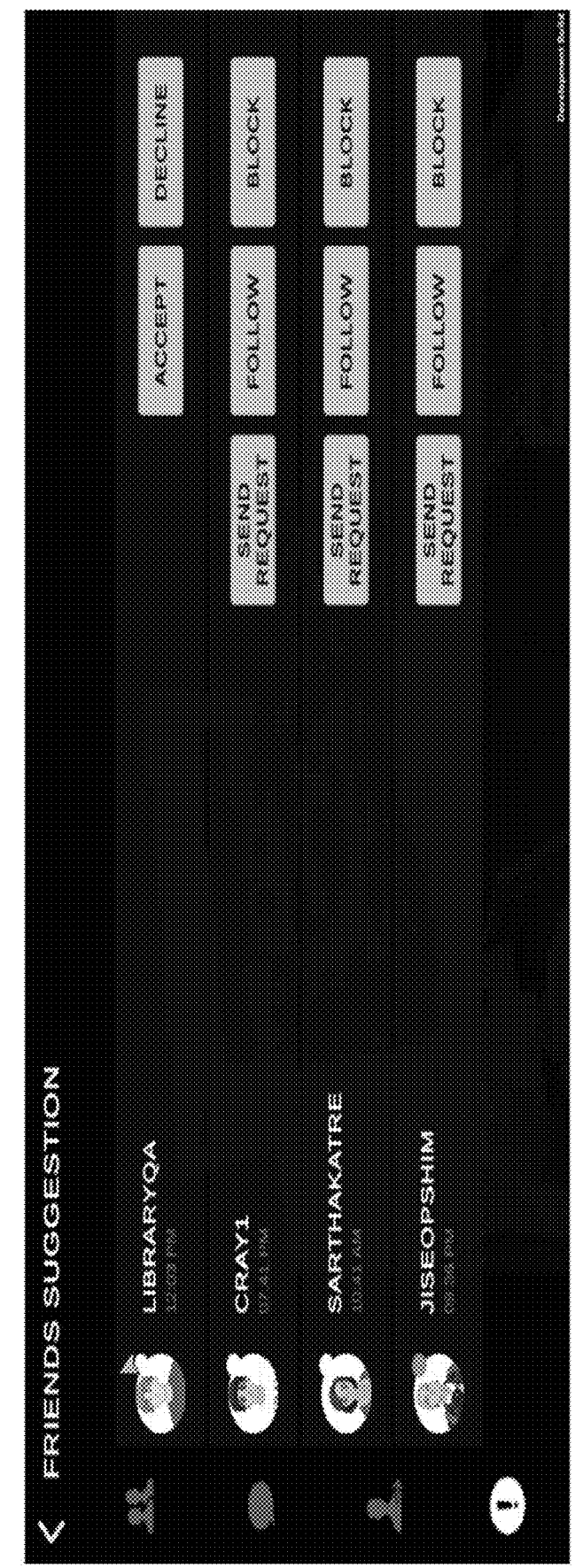
FIG. 13 is an exemplary image illustrating the method for inviting new users and accepting new user requests.

In step 1225, the virtual game management apparatus 14 provides a list of pending invites to the requesting one of the plurality of gaming computing devices 12(1)-12(n) as illustrated in FIG. 13.

Next in step 1230, the virtual game management apparatus 14 provides an option to accept, decline, or to block the invitee as illustrated in FIG. 13 and the exemplary method ends at step 1235. Additionally, the exemplary method of also ends at step 1235 when the virtual game management apparatus 14 determines that the requesting one of the plurality of gaming computing devices 12(1)-12(n) does not want to accept an invitation.

Figure 14:
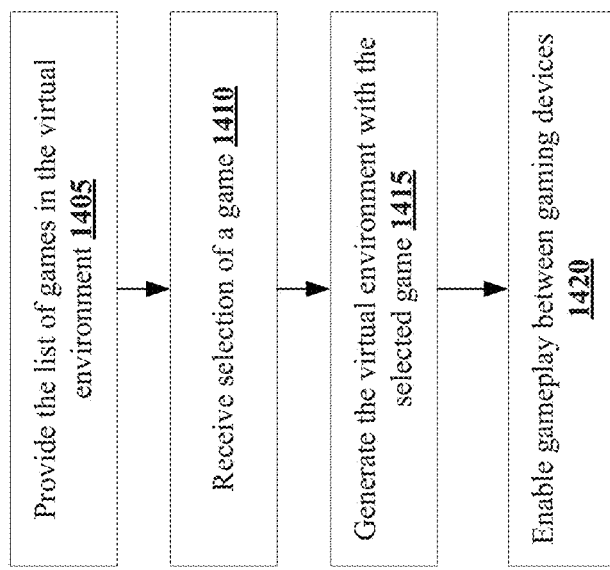
FIG. 14 is an exemplary flowchart illustrating a method for supporting gaming interaction between the gaming computing devices.
Figure 15:
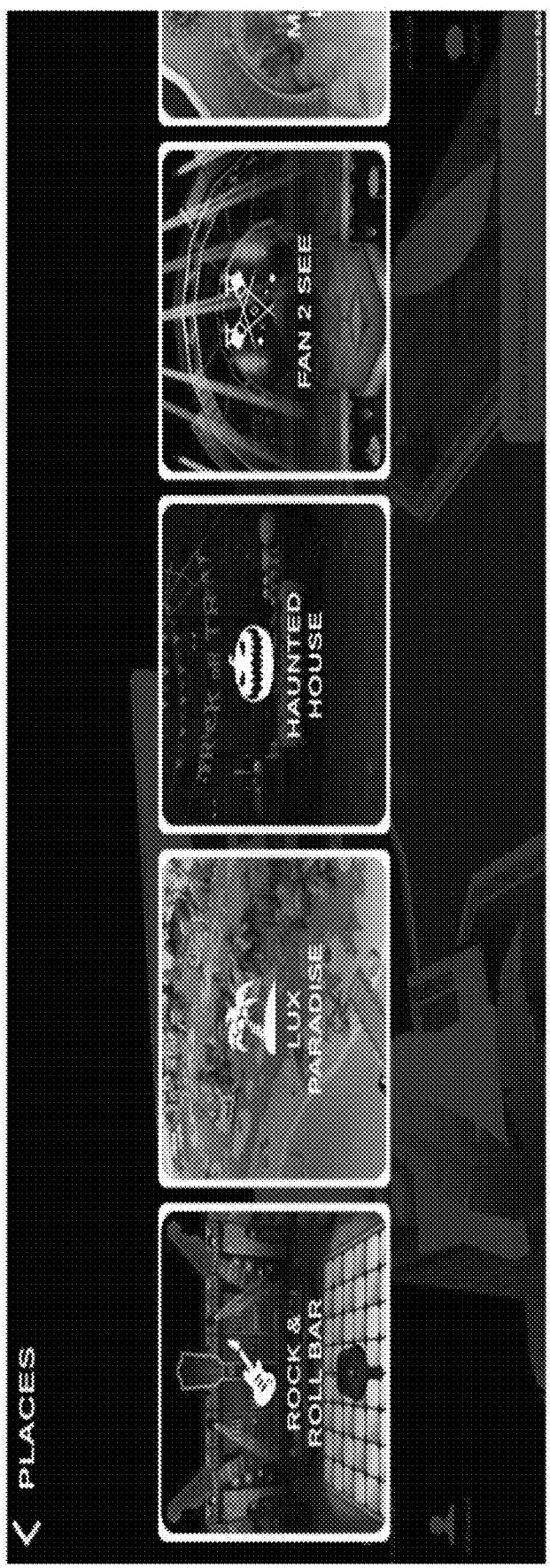
FIG. 15 is an exemplary image illustrating the multiple virtual gaming environment.
Figure 16A:
FIGS. 16A-16D are exemplary images illustrating different virtual gaming environment.
Figure 16B:
Figure 16C:
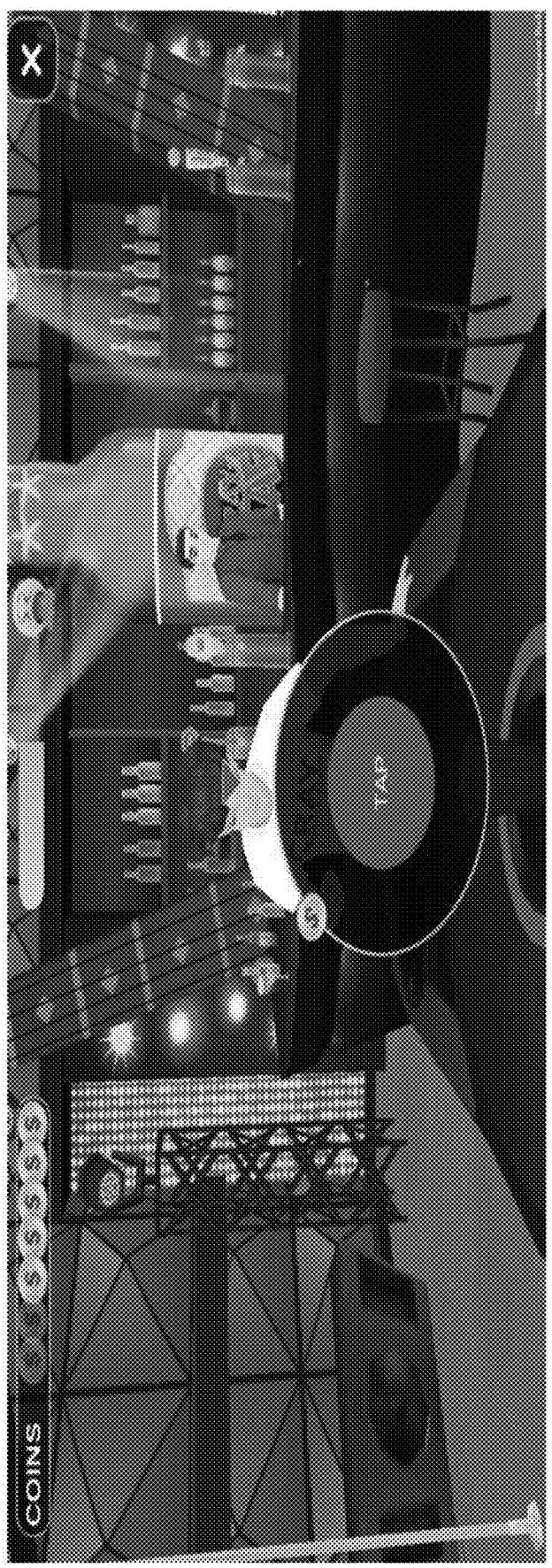
Figure 16D:

Further in this example, one of the interactions that is enabled by the virtual game management apparatus 14 is game play between the pluralities of gaming computing devices 12(1)-12(n) which will now be further illustrated with reference to the flowchart in FIG. 14. In step 1405, the virtual game management apparatus 14 provides a list of virtual games that are created and stored within the memory 20, although the virtual games can be stored at other memory locations. By way of example, FIG. 15 is an exemplary image illustrating a list of available virtual games provided to the plurality of gaming computing devices 12(1)-12(n).

Next in step 1410, the virtual game management apparatus 14 receives a selection of a virtual game from the provided list of virtual games from one of the plurality of gaming computing devices 12(1)-12(n).

Next in step 1415, the virtual game management apparatus 14 generates a virtual environment with the selected game, although the virtual game management apparatus 14 can obtain the generated virtual environment with the selected game from the memory 20. By way of example, FIGS. 16A-16D provides examples of the virtual games that are generated within the virtual environment.

In step 1420, the virtual game management apparatus 14 enables the plurality of gaming computing devices 12(1)-12(n) to play the generated virtual game in the virtual environment. Optionally in this example, the virtual game management apparatus 14 can modify the virtual environment based on the selected virtual game, prior to enabling the plurality of gaming computing devices 12(1)-12(n) to play the generated virtual game. In this example, the virtual game management apparatus 14 creates a session via TCP/IP connection with each of the plurality of gaming computing devices 12(1)-12(n) at the time of initiating the virtual gaming session, although other types or amounts of sessions can be created with the plurality of gaming computing devices 12(1)-12(n). Further, the virtual game management apparatus 14 stores the session information associated with each of the plurality of gaming computing devices 12(1)-12(n) and by using the session information, enables the user using the plurality of gaming computing devices 12(1)-12(n) to use different computing devices to play the virtual game. In other words, a user using one of the plurality of gaming computing devices 12(1)-12(n) can initiate the session and start playing the virtual game using one device and then switch to playing the virtual game on another computing device while continuing to play the virtual games in the virtual environment. Additionally, executing or hosting the virtual games on the memory 20 enables the virtual game management apparatus 14 to be able to provide a unique virtual gaming platform that can be accessed by multiple gaming computing devices. Further in this example, the virtual game management apparatus 14 allows communication between the plurality of gaming computing devices 12(1)-12(n) via a textual chat window, although other types of communication channel can be established between the plurality of gaming computing devices 12(1)-12(n). In this example, the data shared within the textual chat window is encrypted when it is sent and decrypted when received. In other words, the textual chat window provides end to end encryption so that the chat messages are communicated or exchanged securely. Furthermore in this example, the virtual game management apparatus 14 can send notification to the plurality of gaming computing devices 12(1)-12(n) playing the virtual games in another virtual environments when there is an event that occurs during gameplay within a virtual environment. In other words, when a user playing one of the virtual games via one of the plurality of gaming computing devices 12(1)-12(n) gets injured in the virtual game in one environment, then the virtual game management apparatus 14 sends out a notification to all the other plurality of gaming computing devices 12(1)-12(n) playing the virtual games in another virtual environment.

Figure 17:
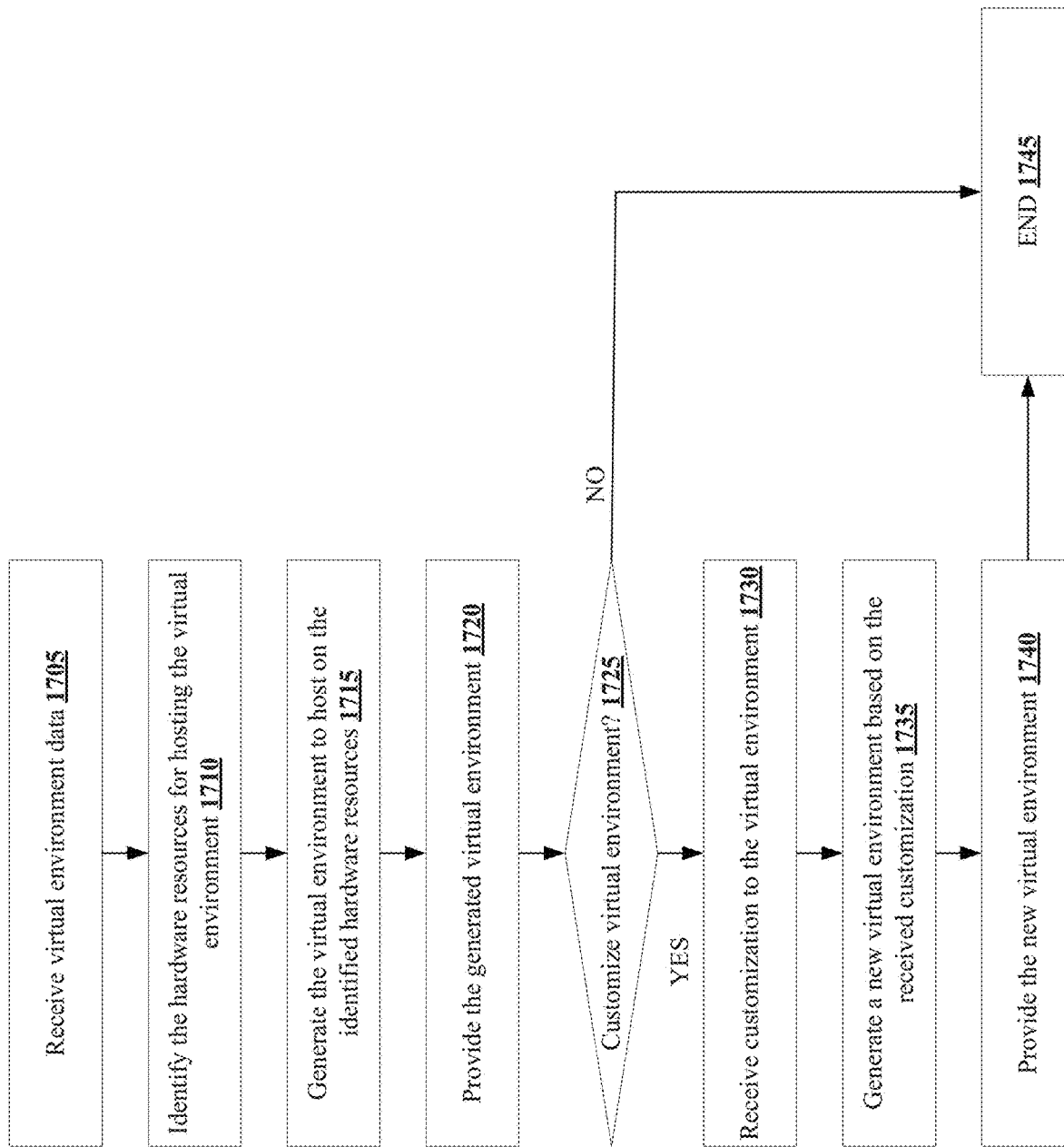
FIG. 17 is an exemplary flowchart illustrating a method for customizing the virtual environment.

A method for generating and customizing the virtual environment will now be illustrated with reference to FIG. 17. First in step 1705, the virtual game management apparatus 14 receives virtual environment data from one of a plurality of creation source computing devices 13(1)-13(n), although the virtual game management apparatus 14 can receive other types of data from other devices. In this example, the virtual environment data can include data regarding a selected type of environment, such as a park, a hotel, or a restaurant, and one or more data objects required within the virtual environment, such as a tree, a bird, a table, or other object, although the virtual environment data can include other types and/or numbers of data and/or data objects.

In step 1710, the virtual game management apparatus 14 identifies the amount of hardware resources required to host or execute the received virtual environment data. In this example, the hardware resources includes processor, memory, bandwidth, although other types or amounts of hardware resources can be considered.

In step 1715, the virtual game management apparatus 14 generates an interactive virtual environment using the identified hardware resources and the received virtual environment data, although the virtual game management apparatus 14 can generate the virtual environment using other types or amounts of information. In this example, the plurality of gaming computing devices 12(1)-12(n) can interact within the created virtual environment to play games, chat with other plurality of gaming computing devices 12(1)-12(n), although other types of interactions could supported on the created virtual environment. In this example, the generated virtual environment includes graphics and animation that is similar to real-life events, although the virtual environment can include other types or amounts of information.

In step 1720, the virtual game management apparatus 14 provides the generated virtual environment to the requesting one of the plurality of creation source computing devices 13(1)-13(n). In addition, the virtual game management apparatus 14 can also store the generated virtual environment within the memory 20.

Next in step 1725, the virtual game management apparatus 14 determines when there is a requirement to further customize the virtual environment that was provided based on the customization input received from the creation source computing devices 13(1)-13(n), although other techniques can be used to determine whether there is a requirement to further customize the virtual environment. In this example, customizing the virtual environment can relate to changes the appearance and/or the objects within the virtual environment. Accordingly, when the virtual game management apparatus 14 determines that no customization is required, then the No branch is taken to step 1745 where the exemplary method ends.

However, when the virtual game management apparatus 14 determines that customization of the virtual environment is determined to be required, then the Yes branch is taken to step 1730. In step 1730, the virtual game management apparatus 14 receives the required customization data from one or more of the creation source computing devices 13(1)-13(n), although the virtual game management apparatus 14 can include other types or amounts of information. In this example, the customization data can include changes to the gaming graphics data, gaming animation data, interaction aspects of the virtual environment, viewing perspective of the virtual environment, although the customization data can include other types or amounts of information.

In step 1735, the virtual game management apparatus 14 generates a new virtual environment or the customized virtual environment using the received customization data and stores the generated new virtual environment within the memory 20, although the generated new virtual environment can be stored at other memory locations. In this example, the new or the customized virtual environment includes changes to the gaming graphics data, gaming animation data, interaction aspects of the virtual environment, viewing perspective of the virtual environment, although the customized virtual environment can include other types of customization.

Figure 10:
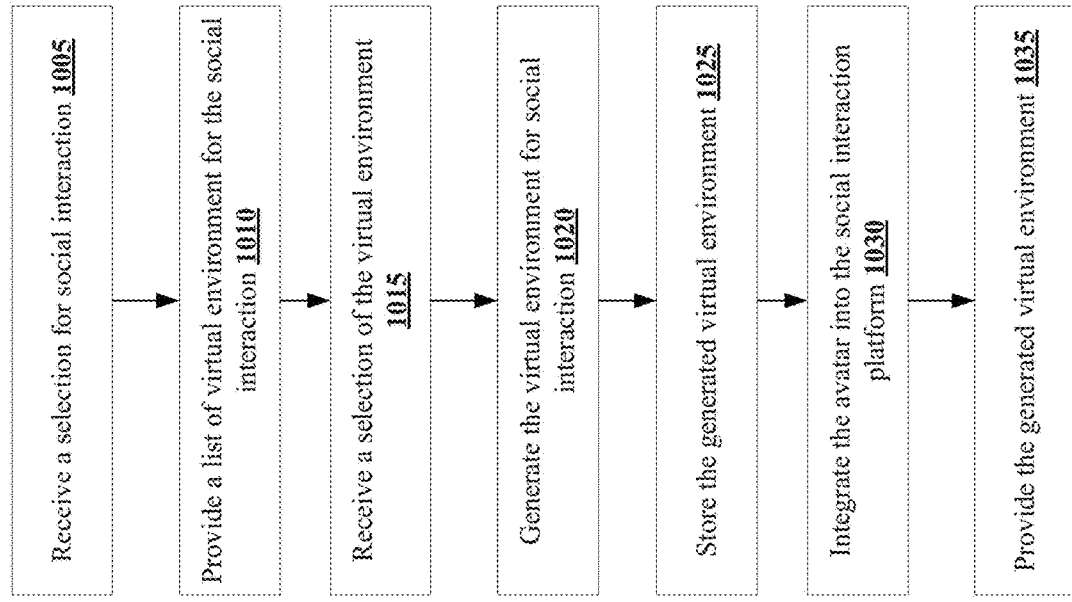
FIG. 10 is an exemplary flowchart illustrating a method for generating and providing a virtual environment.

Alternatively in another example, the virtual game management apparatus 14 can customize the virtual environment based on the hardware and software configuration data associated with one or more of a plurality of gaming computing devices 12(1)-12(n) using the technique illustrated in step 1030 of FIG. 10. In other words, when the plurality of gaming computing devices 12(1)-12(n) play the virtual game within the virtual environment, the virtual game management apparatus 14 can modify the virtual environment to provide optimum performance for each of the plurality of gaming computing devices 12(1)-12(n) used by the gamers. By way of example, the virtual environment can be modified with by providing lower resolution, graphics, and/or animations when the hardware and software configuration data associated with the one or more of a plurality of gaming computing devices 12(1)-12(n) is below a threshold value. On the contrary, the virtual environment can be modified with by providing enhanced resolution, graphics, and/or animations when the hardware and software configuration data associated with the one or more of a plurality of gaming computing devices 12(1)-12(n) is equal to or above a threshold value. In this example, within the customized virtual environment, the virtual game management apparatus 14 can execute a plurality of virtual games that is illustrated with reference to FIG. 14, provide assistance with inviting new gaming computing devices 12(1)-12(n) as illustrated in FIG. 12, provide social interaction as illustrated with reference to FIGS. 10-11, although other types or amounts interactions can be supported in the customized virtual environment.

In step 1740, the virtual game management apparatus 14 provides the generated new virtual environment to the plurality of gaming computing devices 12(1)-12(n) when there is a request received to access the virtual environment and the exemplary method ends at step 1745.

Accordingly, this technology provides methods, non-transitory computer readable medium, and apparatuses that assist with providing a virtual and an interactive gaming environment. In particular, the virtual environment that is generated using the below illustrated techniques solves the technological problem in the existing technologies by providing a highly customizable virtual environment. In the disclosed technology, the customization requirements to the virtual environment is taken from the online gaming developers and a customized virtual environment is developed specifically for each online gaming developers, which is not routine, convention or well-understood. Similarly, the disclosed technology also considers the computing power of the online gaming consumers and accordingly adjusts the interaction with the virtual environment which again is not routine, convention or well understood when compared with the existing technologies.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
    generating, by a computing device, an interactive virtual environment comprising gaming graphics data and animation data to support a plurality of virtual games;
    providing, by the computing device, the generated interactive virtual environment to a creation source computing device;
    receiving, by the computing device, customization data to modify the gaming graphics data and the animation data of the provided interactive virtual environment, from the creation source computing device;
    customizing, by the computing device, the gaming graphics data and the animation data of the provided interactive virtual environment based on the received customization data;
    providing, by the computing device, a list of a plurality of customized interactive virtual environments, to a gaming computing device;
    receiving, by the computing device, a selection of one of a plurality of customized interactive virtual environments from the gaming computing device;
    providing, by the computing device, the selected customized interactive virtual environment to the gaming computing device;
    providing, by the computing device, a list of virtual games available in the selected customized interactive virtual environment to the gaming computing device;
    receiving, by the computing device, a selection of a virtual game from the provided list of virtual games from the gaming computing device; and
    enabling, by the computing device, the gaming computing device to play the selected virtual game in the selected customized interactive virtual environment.

2. The method as set forth in claim 1 further comprising, identifying, by the computing device, hardware data and software data associated with the gaming computing device.

3. The method as set forth in claim 2 further comprising, customizing, by the computing device, the gaming graphics data and the animation data within the selected interactive virtual environment based on identified hardware data and the software data.

4. The method as set forth in claim 1 further comprising, identifying, by the computing device, one or more hardware resources required to host the selected customized interactive virtual environment.

5. The method as set forth in claim 4 further comprising, hosting, by the computing device, the selected customized interactive virtual environment using the identified one or more hardware resources.

6. A non-transitory computer readable medium having stored thereon instructions comprising executable code, which when executed by at least one processor, cause the processor to:
    generate an interactive virtual environment comprising gaming graphics data and animation data to support a plurality of virtual games;
    provide the generated interactive virtual environment to a creation source computing device;

receive customization data to modify the gaming graphics data and the animation data of the provided interactive virtual environment, from the creation source computing device;

customize the gaming graphics data and the animation data of the provided interactive virtual environment based on the received customization data;

provide a list of a plurality of customized interactive virtual environments, to a gaming computing device;

receive a selection of one of a plurality of customized interactive virtual environments from the gaming computing device;

provide the selected customized interactive virtual environment to the gaming computing device;

provide a list of virtual games available in the selected customized interactive virtual environment to the gaming computing device;

receive a selection of a virtual game from the provided list of virtual games from the gaming computing device; and enable the gaming computing device to play the selected virtual game in the selected customized interactive virtual environment.

7. The medium as set forth in claim 6 further comprising, identifying hardware data and software data associated with the gaming computing device.

8. The medium as set forth in claim 7 further comprising, customizing the gaming graphics data and the animation data within the selected interactive virtual environment based on identified hardware data and the software data.

9. The medium as set forth in claim 6 further comprising, identifying one or more hardware resources required to host the selected customized interactive virtual environment.

10. The medium as set forth in claim 9 further comprising, hosting the selected customized interactive virtual environment using the identified one or more hardware resources.

11. A virtual game management apparatus comprising:
a processor; and
a memory coupled to the processor which is configured to be capable of executing programmed instructions comprising and stored in the memory to:
generate an interactive virtual environment comprising gaming graphics data and animation data to support a plurality of virtual games;
provide the generated interactive virtual environment to a creation source computing device;
receive customization data to modify the gaming graphics data and the animation data of the provided interactive virtual environment, from the creation source computing device;
customize the gaming graphics data and the animation data of the provided interactive virtual environment based on the received customization data;
provide a list of a plurality of customized interactive virtual environments, to a gaming computing device;
receive a selection of one of a plurality of customized interactive virtual environments from the gaming computing device;
provide the selected customized interactive virtual environment to the gaming computing device;
provide a list of virtual games available in the selected customized interactive virtual environment to the gaming computing device;
receive a selection of a virtual game from the provided list of virtual games from the gaming computing device; and
enable the gaming computing device to play the selected virtual game in the selected customized interactive virtual environment.

12. The apparatus as set forth in claim 11 wherein the processor is further configured to be capable of executing the stored programmed instructions to identify hardware data and software data associated with the gaming computing device.

13. The apparatus as set forth in claim 12 wherein the processor is further configured to be capable of executing the stored programmed instructions to customize the gaming graphics data and the animation data within the selected interactive virtual environment based on identified hardware data and the software data.

14. The apparatus as set forth in claim 11 wherein the processor is further configured to be capable of executing the stored programmed instructions to identify one or more hardware resources required to host the selected customized interactive virtual environment.

15. The apparatus as set forth in claim 14 wherein the processor is further configured to be capable of executing the stored programmed instructions to host the selected customized interactive virtual environment using the identified one or more hardware resources.

* * * * *